(12) United States Patent
Törös et al.

(10) Patent No.: US 11,528,452 B2
(45) Date of Patent: Dec. 13, 2022

(54) INDOOR POSITIONING SYSTEM USING BEACONS AND VIDEO ANALYTICS

(71) Applicant: Current Lighting Solutions, LLC, East Cleveland, OH (US)

(72) Inventors: Gábor Törös, BudaPest (HU); Tamás Varjasi, BudaPest (HU); István Maros, BudaPest (HU); Roland Bátai, BudaPest (HU)

(73) Assignee: CURRENT LIGHTING SOLUTIONS, LLC, Beachwood, OH (US)

( * ) Notice: Subject to any disclaimer, the term of this patent is extended or adjusted under 35 U.S.C. 154(b) by 145 days.

(21) Appl. No.: 14/982,584

(22) Filed: Dec. 29, 2015

(65) Prior Publication Data
US 2017/0187991 A1  Jun. 29, 2017

(51) Int. Cl.
| | |
|---|---|
| *H04N 7/18* | (2006.01) |
| *H04W 4/029* | (2018.01) |
| *G01S 5/02* | (2010.01) |
| *G06V 20/52* | (2022.01) |
| *H04N 5/247* | (2006.01) |
| *G06K 9/62* | (2022.01) |
| *G01S 5/16* | (2006.01) |

(52) U.S. Cl.
CPC ........... *H04N 7/181* (2013.01); *G01S 5/0257* (2013.01); *G06V 20/52* (2022.01); *H04W 4/029* (2018.02); *G01S 5/16* (2013.01); *G06K 9/6293* (2013.01); *H04N 5/247* (2013.01)

(58) Field of Classification Search
CPC ....... H04W 64/00; H04W 4/02; H04W 4/008; H04W 4/023; H04W 4/04; H04W 4/043; H04W 4/028; H04W 4/021; H04W 4/025; G01S 5/0252; G01S 5/02; G01S 5/14; G01S 19/48; G01S 5/0263; G01S 5/021; G01S 5/0294; G01C 21/206; G06Q 30/0261
See application file for complete search history.

(56) References Cited

U.S. PATENT DOCUMENTS

| | | | |
|---|---|---|---|
| 2010/0121567 A1 | 5/2010 | Mendelson | |
| 2011/0237185 A1* | 9/2011 | Murray | H04W 4/023 455/41.1 |
| 2013/0045751 A1* | 2/2013 | Chao | G01C 21/206 455/456.1 |
| 2013/0225199 A1 | 8/2013 | Shaw | |

(Continued)

*Primary Examiner* — Farhan Mahmud
(74) *Attorney, Agent, or Firm* — Buckley, Maschoff & Talwalkar LLC (57) ABSTRACT

A method and system, the method including transmitting a unique identifier of at least one radio frequency (RF) transmitter to a device in a vicinity of the RF transmitter; acquiring images of objects by a vision system, the vision system comprising at least one image capturing device and an image processing unit to determine objects in the images acquired by the image capturing device; determining, by a controller, a location of the device based on, at least in part, the unique identifier of one of the at least one RF transmitters; and determining, by the controller, a precise location of the device based on a correlation between the location of the device determined based on the unique identifier and the objects captured in the images acquired by the image capturing device.

17 Claims, 5 Drawing Sheets

(56) References Cited

U.S. PATENT DOCUMENTS

2014/0107846 A1\* 4/2014 Li ........................... F24F 11/30
 700/275
2014/0285660 A1 9/2014 Jamtgaard et al.
2014/0324527 A1\* 10/2014 Kulkarni ............ G06Q 30/0261
 705/7.29

\* cited by examiner

```
┌─────────────────────────────────────────────┐
│                                             │
│  DETERMINE LOCATION OF DEVICE USING BEACONS │
│                                             │
│                                        305  │
└─────────────────────────────────────────────┘
                      │
                      ▼
┌─────────────────────────────────────────────┐
│                                             │
│  FURTHER REFINE LOCATION PRECISION OF DEVICE USING │
│              VISION SYSTEM                  │
│                                        310  │
└─────────────────────────────────────────────┘
                      │
                      ▼
```

INDOOR POSITIONING SYSTEM USING BEACONS AND VIDEO ANALYTICS

BACKGROUND

Indoor positioning systems are known that use beacons to transmit an identifier. These systems are known to use omni-directional antennas to broadcast a signal including the identifier. The signal broadcast by the beacon and its associated omni-directional antenna may be detected and received by a receiver device that operates to determine its position based on, for example, a strength of the signals that it receives. The identifier from the strongest signal received by the receiver is generally equated with being the closet beacon. However, the strongest signal received by the receiver device may not be transmitted from the beacon closest to the receiver. Some indoor positioning systems may calculate a position based on signals received from multiple beacons. A common problem associated with some indoor positioning systems is the low accuracy of indoor positioning using beacons, even if directional antennas and/or improved positioning algorithms are used.

Therefore, it would be desirable to efficiently provide improved methods and apparatus for providing indoor positioning determinations for a variety of different applications.

BRIEF DESCRIPTION OF THE DRAWINGS

Features and advantages of some embodiments of the present invention, and the manner in which the same are accomplished, will become more readily apparent upon consideration of the following detailed description of the invention taken in conjunction with the accompanying drawings, wherein.

DETAILED DESCRIPTION

Figure 1:
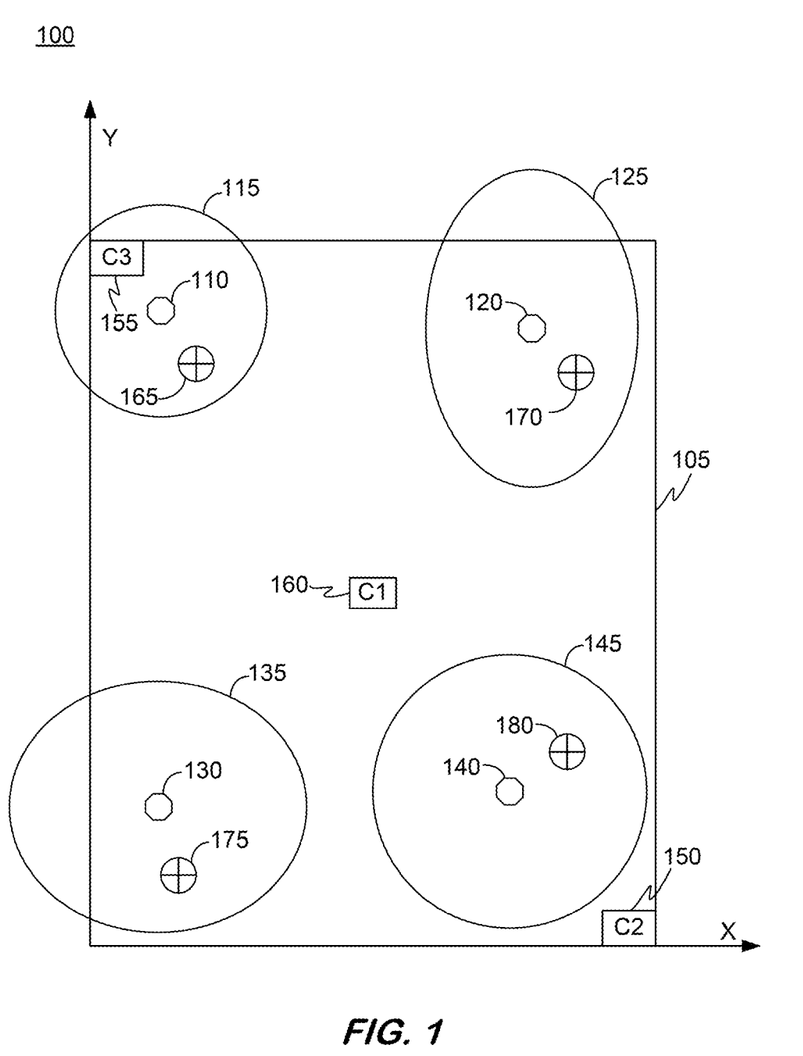
FIG. 1 is an illustrative depiction of a monitored area, including some aspects of a system herein.

FIG. 1 is an illustrative depiction of an environment 100, in accordance with some embodiments herein. Environment 100 includes an area 105 to be monitored by a system. The system is generally referred to herein as an indoor positioning system (IPS) that includes at least one beacon and a vision system. The system determines an approximate position of a device based on a unique identifier associated with the at least one beacon and transmitted therefrom to the device located in a vicinity of the at least one beacon. The at least one beacon comprises a RF transmitter that transmits the unique identified of each beacon. The device may be a portable apparatus or system that can be carried or transported by a person. The device may be operable to receive the unique identifier transmitted from the at least one beacon or, more particularly, the RF transmitter thereof.

In FIG. 1, four beacons each containing a RF transmitter for transmitting the unique identifier (also simply referred to as the "identifier" herein) of the respective bacons are shown disposed in the monitored area 105. The four beacons are shown at 110, 120, 130, and 140. Each beacon transmits a signal having a limited beacon proximity range (BPR). The BPR of beacon 110 is represented by the area defined by 115, the BPR of beacon 120 is represented by the area defined by 125, the BPR of beacon 130 is represented by the area defined by 135, and the BPR of beacon 140 is represented by the area defined by 115. The size and shape of the BPR may be determined, as least in part, by a protocol or technology of the signal generated and transmitted by the beacon, a strength of the transmitted signal, a configuration of the system including the beacons (e.g., interference by other beacons and/or other signals), and other factors.

System 100 further includes a vision system that includes a plurality of image capturing devices. The image capturing devices may, in some embodiments, include a camera of a known technology and resolution and/or a camera technology and resolution that becomes known. The monitored area 105 is monitored by three cameras, including camera C1 at 150, camera C2 at 155, and camera C3 at 160. In some embodiments, the vision system of a monitored area herein may be configured to detect and capture (i.e., "see") objects at any location within the monitored area 105. Accordingly, a monitored area may be covered by one or more cameras. The minimum number of cameras or other image capturing devices may be determined, at least in part, based on the capabilities of the imaging devices, the floorplan of the monitored area, and the obstacles (if any) in the monitored area.

The beacons in system 100 may be positioned and configured to transmit their identifier to devices in a vicinity thereof, where the vicinity of each beacon is determined by the BPR of each respective beacon. In an effort to cover all or substantially all of the monitored area, the beacons may be positioned such that all or substantially all of the monitored area 105 is within a BPR of at least one beacon.

In some embodiments, the beacons may be deployed or installed on or suspended from a ceiling of an indoor area 105 being monitored. In some embodiments, the BPR for a beacon may be about a 10 meter radius wherein the beacons have an omni-directional antenna. In some embodiments, the beacons may have a directional antenna and a BPR of about a 2 meter radius.

In some aspects, the beacons and the vision system may be used to determine the location of objects within the monitored area 105. FIG. 1 shows the position of a plurality of objects 165, 170, 175, and 180. In some embodiments herein, an approximate location of an object may be determined based on the identifier of a beacon nearest the object, wherein the object will be within the BPR of the beacon. As used herein, an "object" may refer to a person, wherein the location of the person can be inferred by the location of a device carried or worn by the person. As such, a location of the device can be equated to a location of the person carrying or wearing the device. In some respects, a device capable of receiving the identifier transmitted by a beacon herein may be a mobile telephone or other apparatus or system that can be carried or worn by a person that is capable of receiving and processing the identifier of the beacons herein.

In some embodiments, the objects may be a machine or other entity to which a device capable of receiving the identifier transmitted by a beacon herein may be attached or affixed (e.g., a robot).

In some embodiments herein, the location of the object may be determined based on a calculated correlation of the location of the object as determined based on the identifier of the beacons and an exact location of the object as acquired by the vision system including the cameras 150, 155, and 160. The location as determined based on the identifier of the beacons is an approximate position due to the limited resolution of the beacons (i.e., the BPR thereof). The vision system herein may determine an exact location of objects in the images it acquires by correlating the captured objects to a reference coordinate system. FIG. 1 shows a reference coordinate system as indicated by the x-axis and the y-axis. In some respects, the cameras of an image capturing system herein may register or calibrate its cameras or other imaging devices to a reference coordinate system, as known or becomes known, prior to acquiring images. In this manner, the location of objects in images acquired after the initial registration or calibration of the cameras can be accurately determined. The precise location of an object/device can be determined by correlating (1) the object having its approximate location determined based on the beacon identifier received by the device and (2) the device acquired by the vision system at a specific/exact location. In one sense, the beacon identifier tells one the identity of an object (i.e., "who") and the vision system tells one the exact location of the object (i.e., "where").

Figure 2:
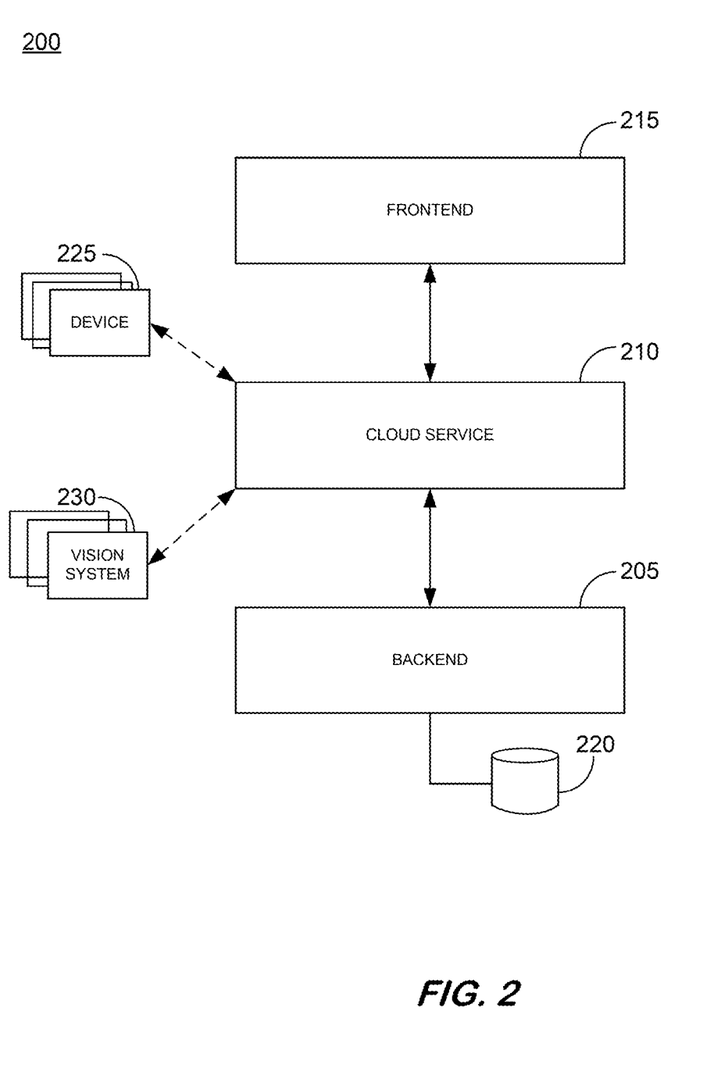
FIG. 2 is illustrative depiction of a system, in accordance with some aspects herein.

FIG. 2 is an illustrative depiction of a system 200, in accordance with some embodiments herein. For example, system 200 includes a backend 205 that may include a server or other processing system, a cloud service 210 or other network system for connecting to and interfacing with devices 225 and vision system(s) 230. A frontend 215 is shown and may provide a user interface, text-based or graphics-based, for interacting with the system, either directly or, in some embodiments, via device 225. In some embodiments, a storage facility 220 is shown coupled to backend 205. Storage facility 220 may comprise part of a database system for persisting location data determined by system 200.

In some embodiments, device 225 may send beacon identifiers received from one or more beacons to backend 205 via cloud service 210. Device 225 may be configured to execute a native application or program to facilitate its capability to receive beacon identifiers from beacons and further transmit them backend 205. In some embodiments, device 225 may execute an application or "app" that can be selectively installed thereon by a user of the device or other entity.

In some embodiments, vision system 230 may also send location information regarding objects in the images it acquires to backend 205 via cloud service 210. Backend 205 may be embodied as a server or other processor-enabled controller executing program instructions to correlate the location of a device based on the beacon identifier and the exact location of objects in captured images.

In some embodiments, cloud service 210 may include one or more of a private and public network, including but not limited to, the internet.

In some embodiments, backend 205 may be a distributed database system comprising a plurality of nodes. In some embodiments, backend 205 may be a centrally configured database system. Backend 205 may physically be remote from device 225 and/or vision system(s) 230.

Figure 3:
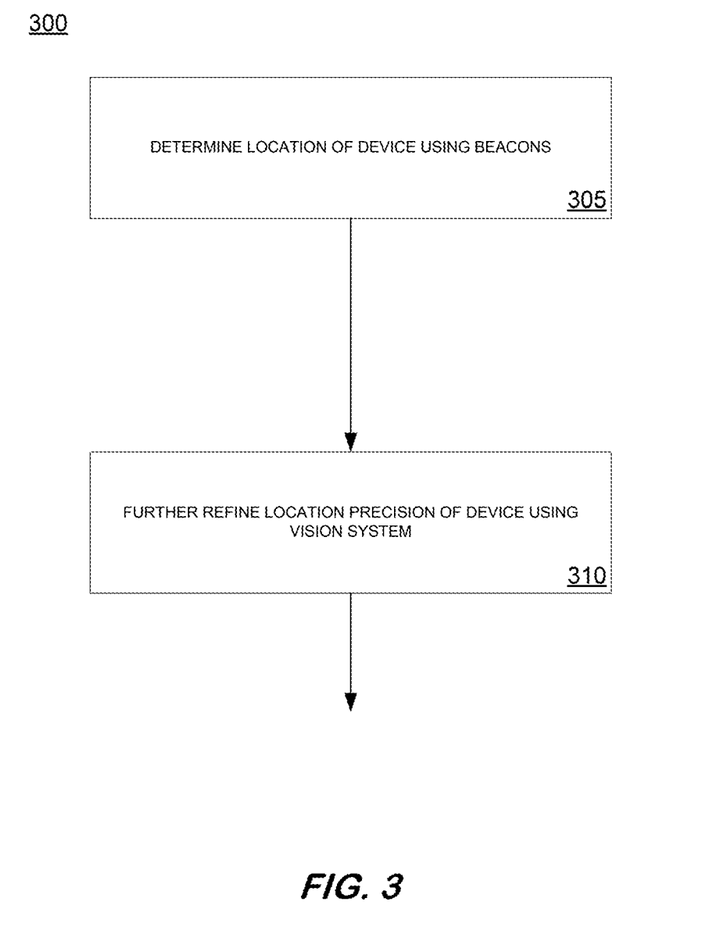
FIG. 3 is an illustrative flow diagram, in accordance with some embodiments herein.

FIG. 3 is an illustrative depiction of a flow diagram for a process 300. Process 300 may be implemented by software components, hardware components, and a combination thereof, including systems such as those shown in FIGS. 1 and 2. At operation 305, a location of a device is determined based on the presence of a device within a vicinity (e.g., BPR) of a beacon, as described herein. The beacon operates to transmit a unique identifier that can be detected by the device. In some embodiments, a radio frequency (RF) transmitter of a beacon device or system transmits the identifier of the beacon in a signal having a known transmission range and propagation pattern. Suitably capable devices functional to detect signals transmitted by RF transmitters of a beacon can receive the signal from the RF transmitter by a RF receiver. In some embodiments, the device (e.g., a mobile telephone) may execute an indoor positioning application or service that facilitates and/or enables reception and processing of the signals from the beacon's RF transmitter. The device may further operate to transmit the identifier received from the beacon to another device or system such as backend 205 (e.g., server or controller) of system 200 for further processing.

Process 300 also includes an operation 310 that further refines the location of the device as determined based on the beacon identifier using a vision system having image capturing devices. In part, the vision system operates to acquire images of objects within an area being monitored by both the beacons and the vision system. The vision system further includes an imaging processor that may determine individual objects of interest in the images acquired by the image capturing devices of the vision system. Objects of interest can include the persons carrying or wearing the devices that detect the identifiers of the beacons herein.

In some aspects, the vision system may use a number of image processing techniques and methods to determine, discern, and track objects in the images that it acquires. Some of the techniques and methods that may be used by a vision system herein include, but are not limited to, image capturing device calibration or registration, object detection, object recognition, and object tracking. The techniques may use, for example, foreground/background separation, motion detection to isolate moving objects from static objects, and other processes. In some aspects, the vision system herein does not collect, maintain, or use personally identifiable information of the objects for which it determines a location.

In some embodiments, at least some aspects of operations 305 and 310 may occur in parallel. In some instances, at least some portions of the locations determined at operation 305 occur before some aspects of operation 310.

Figure 4:
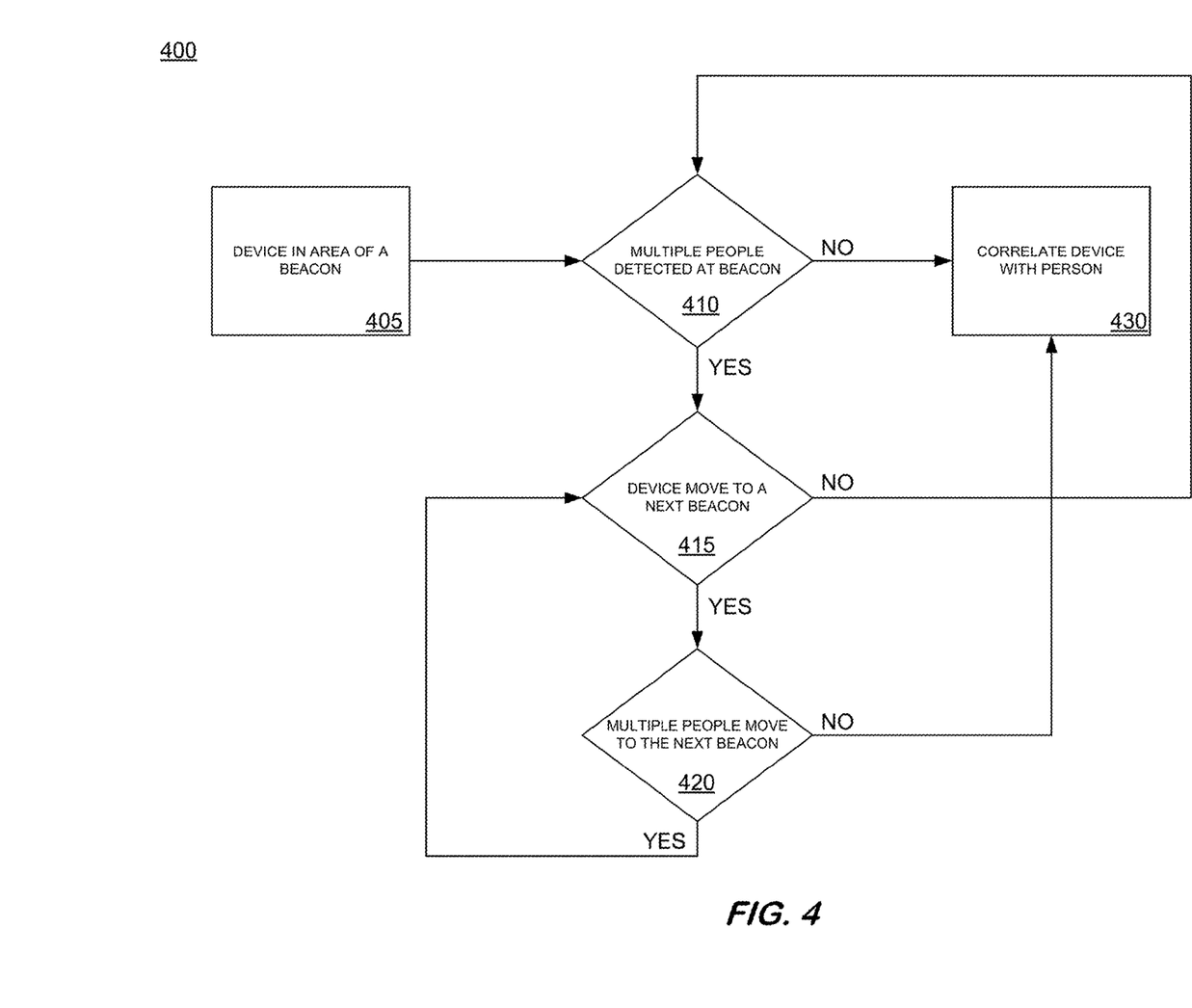
FIG. 4 is an illustrative flow diagram, in accordance with some embodiments herein.

FIG. 4 is an illustrative depiction of a flow diagram for a process 400. Process 400 may be implemented by software components, hardware components, and a combination thereof, including systems such as those shown in FIGS. 1 and 2. Process 400 may be used to determine a location for one or more objects within an area being monitored by an indoor positioning system herein having beacons and a vision system. At 405, a device compatible with the indoor positioning system enters the area being monitored by a particular beacon, for example a beacon having an identifier indentifying it as "Beacon A". In some embodiments, the identifier of a beacon herein may include any alpha-numeric string of any format. In some embodiments, the device of interest may include a mobile phone or other device executing an indoor positioning application, service, or "app". In some regards, the indoor positioning application, service, or "app" may be selectively installed or invoked by a user or other entity having control of the device. In some embodiments, the indoor positioning application, service, or "app" may be preinstalled on the device as delivered from a manufacturer or service provider. In some embodiments, the indoor positioning application, service, or "app" may rely on capabilities of the device, without requiring the acquisition, installation, or modification of the device by the user or another entity. For example, the device (e.g., mobile telephone, tablet computing device, smartwatch, etc.) may include a transceiver or separate receiver and transmitter that can receive signals including beacon identifiers and transmit a signal with the identifier to other devices/systems.

At operation 410, a determination is made whether multiple people (i.e., objects) are detected in a vicinity of Beacon A by a vision system monitoring the area containing Beacon A. If one person/object is detected in the vicinity of Beacon A, then process 400 proceeds to operation 430 where the device at Beacon A is correlated or matched to the one person determined to be at or in the vicinity of Beacon A by the vision system. The vision system is calibrated to the monitored area and can thus precisely determine the location of the objects (e.g., persons) in the images it acquires. The devices located at a particular beacon and correlated to a person or object processed via the vision system at operation 430 can have their location refined or equated to the exact, precise location determined by the vision system herein. Accordingly, it is seen that the beacons and vision system herein can cooperate to provide a precise location of devices/persons in an efficient and unobtrusive manner.

In some embodiments, beacon data regarding the devices receiving beacon identifiers from beacons and reporting those identifiers to a system (e.g., a server or controller of a backend of a system) herein can be recorded for all such devices from an initial time the devices enter the monitored area until the device leaves the monitored area. Such data may be stored in a storage facility such as a memory of a database.

At operation 410, if it is determined that more than one person/object is detected in the vicinity of Beacon A at 410 by analyzing the acquired images of the area at Beacon A, then process 400 proceeds to operation 415. At operation 415, a determination is made whether the device moves to an area covered by a next (i.e., other) beacon. A "next beacon" can be known or determined since the location and relative position of the beacons herein are known. The determination at operation 415 may be made based on the historical beacon data relating to devices within the monitored area of a system herein. If the device of interest moved to a next beacon within the monitored area, then process 400 continues to operation 420. At operation 420, a determination is made whether multiple people moved from the vicinity of Beacon A to the next beacon area. If only one person moved from the vicinity of Beacon A to the next beacon area then the system can determine that the one person that moved to the next beacon is the device of interest.

Again, if at operation 410 it is determined that more than one person/object is detected in the vicinity of Beacon A by analyzing the acquired images of the area at Beacon A, then process 400 proceeds to operation 415. If operation 415 determines the device of interest does not move to a next beacon based on the historical beacon data relating to devices within the monitored area of the system herein, then no precise location of the device may be determined and process 400 returns to operation 410.

If the device of interest moved to a next beacon within the monitored area as determined at operation 415, then process 400 continues to operation 420. However, if operation 420 determines more than one person moved from the vicinity of Beacon A to the next beacon area based on an image analysis, then the process returns to operation 415 for further processing.

As shown, process 400 provides a logical flow for determining a precise location for a device in a monitored area covered by a system including beacons and a vision system, including scenarios where multiple devices and people may be detected and tracked within the monitored area. In some aspects, both historical beacon data and contemporaneous images of the monitored area can be analyzed to discern specific devices and object/persons in an efficient and technologically advanced manner.

It is important noted that the process of FIG. 4 is an illustrative example of one method to determine the position in case of multiple sensing. In some embodiments, other statistical methods may be used to execute a determination of position with high probability, even if the "one user/beacon proximity" case of process 400 is not reached.

All systems and processes discussed herein may be embodied in program code stored on one or more tangible, non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Figure 5:
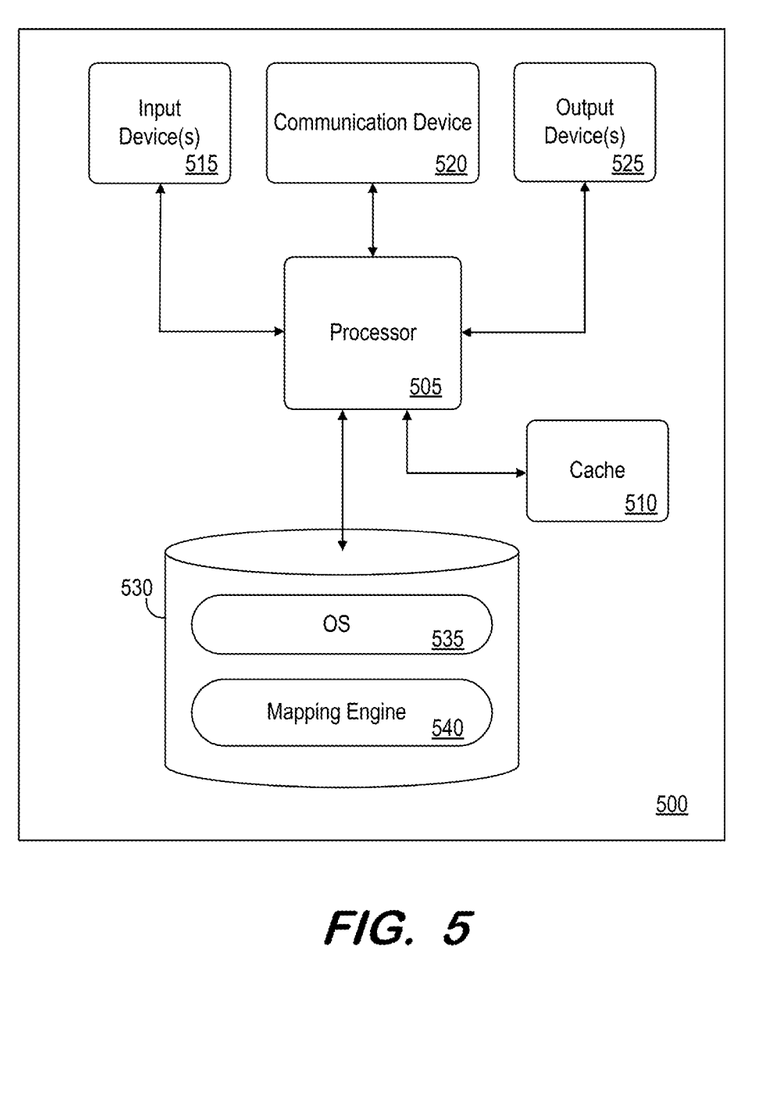
FIG. 5 is a block diagram of an apparatus, in accordance with some embodiments herein.

FIG. 5 is an illustrative depiction of a system, apparatus, or device that may be used to, for example, implement one or more of the logical descriptions of abstractions of FIG. 2. FIG. 5 is a block diagram of a computing device or machine, in accordance with some embodiments. System 500 may be, for example, associated with devices for implementing the processes disclosed herein, including the disclosed indoor positioning system process(es) and backend 205. System 500 comprises a processor 505, such as one or more commercially available Central Processing Units (CPUs) in the form of one-chip microprocessors or a multi-core processor, coupled to a communication device 520 configured to communicate via a communication network (not shown in FIG. 5) to another device or system (e.g., a mobile device receiver). System 500 may also include a cache 510, such as RAM memory modules. The system may further include an input device 515 (e.g., a touchscreen, mouse and/or keyboard to enter content) and an output device 525 (e.g., a touchscreen, a computer monitor to display, a LCD display). In some embodiments, system 500 may perform at least some of the functions associated with one or more of the logical descriptions and abstractions of FIGS. 2, 3, and/or 4.

Processor 505 communicates with a storage device 530. Storage device 530 may comprise any appropriate information storage device, including combinations of magnetic storage devices (e.g., a hard disk drive), optical storage devices, solid state drives, and/or semiconductor memory devices. In some embodiments, storage device 530 may comprise a database system, including in some configurations an in-memory database.

Storage device 530 may store program code or instructions to control an operation of a computing device (e.g., system 500) to perform device location determination and mapping functions, in accordance with processes herein. Processor 505 may perform the instructions for implementing, for example, process 300 and/or 400 in accordance with any of the embodiments described herein. Program instructions for determining a location for a mobile device in a indoor facility executed by a mapping engine 540 may be provided, as well as other program elements, such as an operating system 535. Storage device 530 may also include data used by system 500, in some aspects, in performing one or more of the processes herein, including individual processes, individual operations of those processes, and combinations of the individual processes and the individual process operations.

Although embodiments have been described with respect to certain contexts, some embodiments may be associated with other types of devices, systems, and configurations, either in part or whole, without any loss of generality. For example, in some embodiments, a yagi antenna may be used to radiate signals parallel to the antenna. In some such embodiments, the antenna may be housed in separate module where the module is positioned to take advantage of the radiation pattern of the yagi antenna.

In some embodiments, at least some of the information from the image processing unit(s) herein may be used as a basis for lighting control commands. The lighting commands may be used to invoke, adjust, and otherwise control various parameters related to a lighting system. In some use-cases, such as retail environments, the lighting system commands derived from, based on, or otherwise related to the information from the image processing unit(s) herein may be transmitted to the applicably configured luminaires to adjust the lighting thereof to one or more desired and/or environmental requests and/or requirements.

In some embodiments, the information provided by the image processing unit(s) herein may be made available to a third party. The information may be sent directly to the third party or via a cloud service. In some aspects, a connection to a cloud service may be accomplished by one or more wired (e.g., Ethernet) connections and/or wireless (e.g., GPRS modem, Wifi, etc.) connections, either alone or in combination with each other. In some instances, the third-party may be a management company or other service provider having an expertise in various aspects of managing, maintaining, and controlling lighting systems to improve the technical aspects of a retail environment based on actual data of the retail environment/landscape.

In some contexts and use-cases, processes and systems herein may provide value, at least in part, by making the processed video information available for the owner of the lighting system (and others such as third-party management or service providers). For example, some of the processes and systems herein may determine the most frequent routes and high interest areas in a retail environment (e.g., a retail store, etc.), determine the number of customers in the retail location (not just a presence of some customers based on a motion sensing system alone), and provide position-specific information for the benefit of customers in the retail location's specific aisles, departments, etc. It is noted that while the vision system information obtained by some of the systems and processes herein might be used to technically enhance retail lighting environments (e.g., enhance/encourage/direct customers to certain areas, items, and displays (e.g., sale promotions) in a timely and efficient manner, the information may be used in other contexts (e.g., various public area applications such as public transportation centers, arenas, etc.) without any loss of generality. That is, the vision systems disclosed herein may be used to control (intelligent) lighting systems and for customer analytics in retail contexts, as well as other contexts and use-cases.

In some regards, the information generated by the systems and processes herein may be used as inputs to sophisticated adaptive lighting control systems and devices. The information can also prove valuable for facility owners and others (e.g., service and/or facility managers) to optimize the configuration of retail environments and provide position-specific services and marketing information to their customers therein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A system comprising:
   at least one radio frequency (RF) transmitter to transmit a unique identifier thereof to a mobile device in a vicinity of the RF transmitter;
   a vision system comprising at least two image capturing devices disposed external to the mobile device and an image processing unit to identify objects captured in images acquired by the at least two image capturing devices, the at least two image capturing devices being registered or calibrated to a reference coordinate system; and
   a controller remote from the mobile device, the controller to:
      process a unique identifier of one of the at least one RF transmitters received from the mobile device,
      determine a rough location estimate of the mobile device based, at least in part, on the unique identifier of the one of the at least one RF transmitters,
      identify a plurality of objects in the captured images, at least one of the plurality of objects comprising the mobile device, and
      determine a precise location estimate of the mobile device and determine which of the plurality of objects in the captured images comprises the mobile device based on a correlation between the location of the mobile device determined based on the unique identifier and the objects captured in the images acquired by the at least two image capturing devices,
      wherein at least a portion of one or more first operations to determine the rough location estimate are performed in parallel with at least a portion of one or more second operations to determine the precise location estimate.

2. The system of claim 1, wherein each of the at least one RF transmitter is located at a known position.

3. The system of claim 1, wherein the at least one RF transmitter and the vision system are located in a predetermined area to be monitored by the at least one RF transmitter and the vision system, wherein the vision system is capable of detecting objects within the entire monitored area.

4. The system of claim 1, wherein location information associated with the objects captured in the images acquired by the at least two image capturing devices is transmitted to the controller.

5. The system of claim 4, wherein the location information comprises coordinates of the objects captured in the images relative to the reference coordinate system to which the at least two image capturing devices is associated.

6. The system of claim 1, wherein the at least one RF transmitter comprises a directional radiating element, and wherein the at least one directional radiating element comprises one of a planar patch antenna, a helical antenna, a Yagi antenna and an array of a plurality thereof.

7. The system of claim 1, further comprising at least one beacon comprising the at least one radio frequency (RF) transmitter, wherein the at least one beacon is deployed or installed on or suspended from a ceiling of an indoor area being monitored.

8. The system of claim 1, wherein the objects are persons carrying or wearing the device or are machines to which the device is attached or affixed.

9. A method comprising:
   transmitting a unique identifier of at least one radio frequency (RF) transmitter to a device in a vicinity of the RF transmitter;

acquiring images of objects by a vision system, at least one of the objects comprising a mobile device, the vision system comprising at least two image capturing devices disposed external to the mobile device and an image processing unit to identify objects in the images acquired by the at least two image capturing devices, the at least two image capturing devices being registered or calibrated to a reference coordinate system prior to acquiring the images;

processing, by a controller remote from the mobile device, a unique identifier of one of the at least one RF transmitters received from the mobile device;

determining, by the controller:
- a rough location estimate of the mobile device based on, at least in part, the unique identifier of the one of the at least one RF transmitters,
- a plurality of objects in the captured images, at least one of the plurality of objects comprising the mobile device, and
- a precise location estimate of the mobile device and determining which of the plurality of objects in the captured images comprises the mobile device based on a correlation between the location of the mobile device determined based on the unique identifier and the objects captured in the images acquired by the at least two image capturing devices,
- wherein at least a portion of one or more first operations to determine the rough location estimate are performed in parallel with at least a portion of one or more second operations to determine the precise location estimate.

10. The method of claim 9, wherein the at least one RF transmitter transmits a Bluetooth® low energy signal.

11. The method of claim 9, wherein each of the at least one RF transmitter is located at a known position.

12. The method of claim 9, wherein the at least one RF transmitter comprises a plurality of RF transmitters.

13. The method of claim 9, wherein the at least one RF transmitter and the vision system are located in a predetermined area to be monitored by the at least one RF transmitter and the vision system, wherein the vision system is capable of detecting objects within the entire monitored area.

14. The method of claim 9, further comprising transmitting location information associated with the objects captured in the images acquired by the at least two image capturing devices to the controller.

15. The method of claim 14, wherein the location information comprises coordinates of the objects captured in the images relative to a reference coordinate system to which the at least two image capturing devices is associated.

16. The method of claim 9, wherein the objects are persons carrying or wearing the device or are machines to which the device is attached or affixed.

17. A system comprising:
- at least one beacon comprising at least one radio frequency (RF) transmitter to transmit a unique identifier thereof to a mobile device in a vicinity of the RF transmitter, wherein the at least one beacon is deployed or installed on or suspended from a ceiling of an indoor area being monitored;
- a vision system comprising at least one image capturing system disposed external to the mobile device and an image processing unit to identify at least one object captured in images acquired by the image capturing system, wherein the at least one object is a person carrying or wearing the device or is a machine to which the mobile device is attached or affixed, the at least one image capturing device registered or calibrated to a reference coordinate system; and
- a controller remote from the mobile device, the controller to:
  - process a unique identifier of one of the at least one RF transmitters received from the mobile device,
  - determine a rough location estimate of the mobile device based, at least in part, on the unique identifier of the one of the at least one RF transmitters,
  - identify a plurality of objects in the captured images, at least one of the plurality of objects comprising the mobile device, and
  - determine a precise location estimate of the mobile device and determine which of the plurality of objects in the captured images comprises the mobile device based on a correlation between the location of the mobile device determined based on the unique identifier and the at least one object captured in the images acquired by the image capturing system,
  - wherein at least a portion of one or more first operations to determine the rough location estimate are performed in parallel with at least a portion of one or more second operations to determine the precise location estimate.

* * * * *